W. McA. JOHNSON.
APPARATUS FOR SMELTING ORES YIELDING A VOLATILE METAL.
APPLICATION FILED NOV. 9, 1908.
964,268.
Patented July 12, 1910.
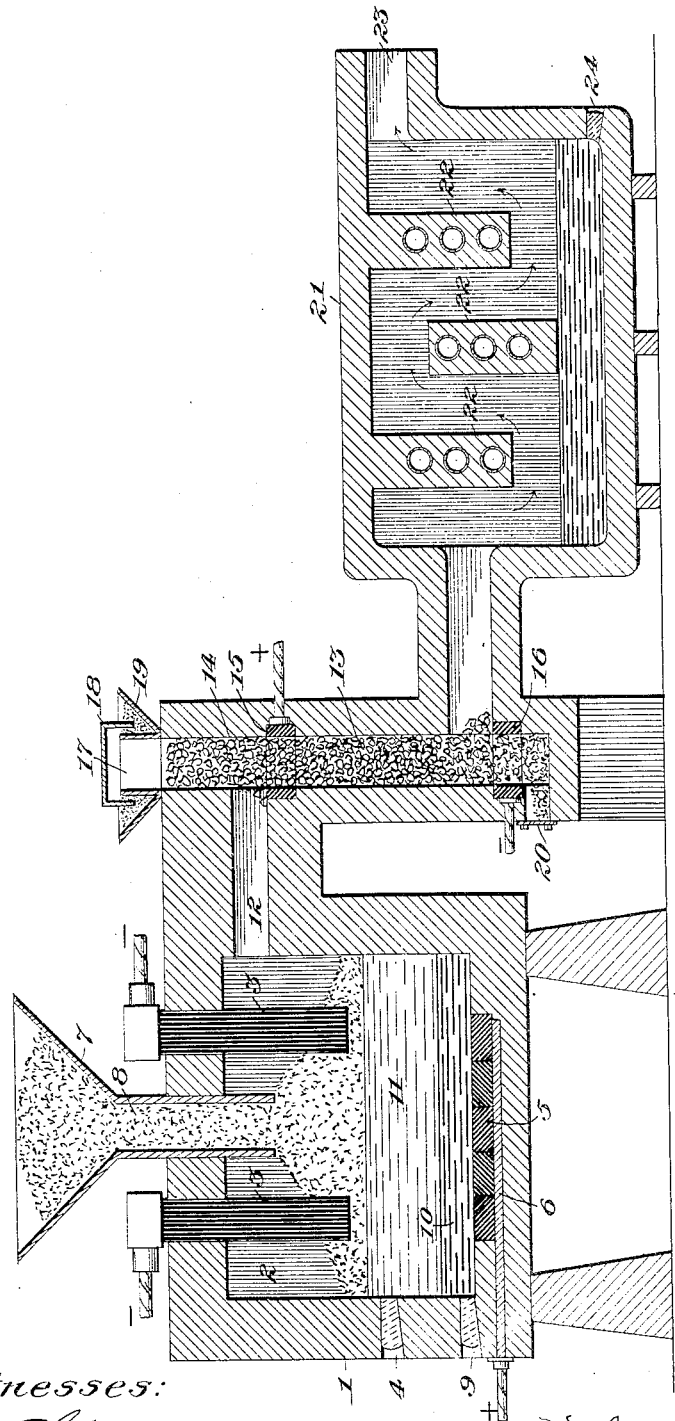
Witnesses:
Geo. E. Gauett.
Chas. H. Potter.
Inventor:
Woolsey McA. Johnson,
by Byrnes & Townsend,
Att'ys.

UNITED STATES PATENT OFFICE.

WOOLSEY McA. JOHNSON, OF HARTFORD, CONNECTICUT, ASSIGNOR TO THE CONTINUOUS ZINC FURNACE COMPANY, OF HARTFORD, CONNECTICUT, A CORPORATION OF CONNECTICUT.

APPARATUS FOR SMELTING ORES YIELDING A VOLATILE METAL.

964,268.  Specification of Letters Patent.  Patented July 12, 1910.

Application filed November 9, 1906. Serial No. 342,666.

REISSUED

*To all whom it may concern:*

Be it known that I, WOOLSEY McA. JOHNSON, a citizen of the United States, residing at Hartford, in the county of Hartford and State of Connecticut, have invented certain new and useful Improvements in Apparatus for Smelting Ores Yielding a Volatile Metal, of which the following is a specification.

This invention is an apparatus for smelting ores yielding a volatile metal, said apparatus comprising, in operative connection, an electric smelting furnace, a reducer for the volatile reaction products therefrom, and a condenser.

In the preferred embodiment of the invention the electric furnace is so constructed as to facilitate the production and removal of the fluid slag, and the reducer comprises a chamber for containing a body of coke, coal or other carbonaceous material, provided with electrodes in contact with said body.

For a full understanding of the invention reference is made to the accompanying drawing, showing in central vertical section a preferred form of apparatus embodying the invention.

Referring to said drawing, 1 represents an electric furnace, shown as comprising a smelting chamber 2 formed of or interiorly lined with a suitable refractory material, 3, 3 representing carbon electrodes supported in the upper part of the furnace and terminating above the level of a slag tap 4. The electrodes 3, 3 are preferably of the same polarity, the opposing electrode 5 being embedded in the hearth of the furnace, in electrical contact with a conductive plate or bar 6. 7 is a hopper for the introduction of the charge 8, and 9 is a tap for the removal of non-volatile metals or matte 10. It will be noted that in this form of furnace the current traverses the bath of slag 11, superheating the same and rendering tapping easy.

The volatile reaction products pass through the outlet 12 and thence through a column 13 of coke or coal contained in a chamber 14 and adapted to be heated by an electric current passing between upper and lower ring electrodes 15, 16, set in the walls of the reducing chamber. The reducing chamber is preferably connected electrically in series with the furnace.

17 is a charging aperture for the coke or coal, normally closed by a cover 18 set in a sand or other seal 19.

20 is a discharge gate for coke and ash, the coke being replaced from time to time as may be necessary for maintaining substantially constant electrical conditions.

From the reducing chamber 14 the vapors, freed from carbon dioxid, aqueous vapor and other compounds capable of oxidizing zinc, pass to a suitable condenser 21, shown as provided with water-cooled partial partitions 22 constructed to direct the vapors in a tortuous path.

23 is the outlet for non-condensing gases, and 24 the metal tap.

In the smelting of zinc ores in the manner heretofore practiced the ore has usually been mixed with an excess of carbon above the amount necessary for the reduction, the purpose of such excess being two-fold, viz. (1) to insure a highly reductive charge or one capable of effecting the substantial reduction of carbon dioxid, aqueous vapor, and other reaction products which are capable of oxidizing zinc at or near its temperature of condensation; and (2) to insure the presence of carbon in the residue, whereby the same is rendered pulverulent and infusible, any slag fusible at the temperature of reduction being absorbed or retained by the carbon. This is of the utmost importance in externally fired furnaces, for a fluid slag or matte in contact with externally fired fireclay retorts would quickly destroy them.

In the use of my apparatus I prefer to incorporate with the charge only such proportion of carbon as is necessary for the reduction of the metallic constituents thereof, producing thereby an easily fusible slag which may be tapped off as desired; any lead, copper or iron accumulates in metallic state beneath the slag and is withdrawn as desired; and fresh portions of the charge may be admitted continuously or at intervals. I thereby secure the advantages of continuous operation.

In order to operate as above described, and to secure an efficient condensation of metal, that is, a high ratio between the metal recovered in the condenser and the total metal volatilized, it is necessary that the operation should proceed under certain definite conditions: 1. The smelting should be conducted in an electric furnace: as above stated the production of fluid slags would be destructive to externally fired retorts, and any method other than retorting would require the introduction of such quantities of air in the form of a blast that it would be impossible to secure efficient condensation. 2. The mineral components of the charge which enter into the slag should preferably be so proportioned as to yield a slag fusible at 1100° to 1175° C., such slag being superheated at the working temperature of the furnace, 1250°–1300° C., and therefore readily tapped. 3. The gases derived from a charge of the character described are necessarily oxidizing in character and are passed through a body of porous carbonaceous material at a high temperature, and preferably under conditions of maximum reductivity secured by electric heating.

It is not essential that the body of carbon employed for reducing volatile reaction products should be electrically heated, but such electrical heating possesses peculiar advantages in this relation, in that in addition to the high average temperatures, above the condensing point of zinc, which are readily secured, there are presented a multitude of points of extremely high temperature, viz. the points of local arcing. At such points the vapor of carbon is present and the carbon is in a condition of maximum reductivity. I have found that by this means I am able to secure a more perfect reduction of the volatile products than could be obtained by operating at a temperature of 1020° to 1150° C. upon a charge containing a large excess of carbon.

I am aware that it has been proposed to pass zinc vapors from a retort or furnace operating on a charge having an excess of carbon through a body of heated carbon, and I do not claim such procedure. Such method may be efficient as regards recovery of the metal, but is necessarily uneconomical because the working is necessarily intermittent.

I am further aware that it has been proposed to secure the advantages of a continuous operation by limiting the proportion of carbon in the charge, the zinc vapors being thereafter directly condensed. In this case such economics as result from continuous operation are secured, but the process is necessarily inefficient and uncommercial by reason of the loss of zinc by oxidation by carbon dioxid.

I believe myself to be the first to recognize that a continuous operation may be combined with a high degree of working efficiency by electrically smelting a charge adapted to yield a fusible slag, and passing the vapors therefrom through a body of carbon at a reducing temperature, and preferably at the temperature of maximum reductivity, that is to say at a temperature at which carbon vapors are present.

I claim:

1. Apparatus for smelting ores yielding a volatile metal, comprising, in operative connection, an electric smelting furnace, a porous body of carbonaceous material, a condenser, and means for heating said body of carbonaceous material, substantially as described.

2. Apparatus for smelting ores yielding a volatile metal, comprising, in operative connection, an electric smelting furnace, a porous body of carbonaceous material, a condenser, and electrodes disposed in contact with said body of carbonaceous material, substantially as described.

3. Apparatus for smelting ores yielding a volatile metal, comprising, in operative connection, an electric smelting furnace, a reducing chamber containing a carbonaceous material, a condenser, and ring electrodes disposed in said reducing chamber near opposite ends thereof, substantially as described.

4. Apparatus for smelting ores yielding a volatile metal, comprising, in operative connection, an electric smelting furnace, a reducing chamber containing a carbonaceous material and having charging and discharging apertures, a condenser, and ring electrodes disposed in said reducing chamber near opposite ends thereof, substantially as described.

5. In apparatus for smelting ores yielding a volatile metal, an electric furnace comprising a closed furnace chamber, electrodes in the upper and lower portions of the same, a slag tap intermediate said electrodes whereby the current is caused to traverse a bath of slag means for collecting and condensing the volatile metal evolved in said apparatus, substantially as described.

6. In apparatus for smelting ores yielding a volatile metal, an electric furnace comprising a closed furnace chamber, electrodes in the upper and lower portions of the same, a charging aperture in the upper portion of the furnace, a slag tap intermediate said electrodes whereby the current is caused to traverse a bath of slag means for collecting and condensing the volatile metal evolved in said apparatus, substantially as described.

In testimony whereof, I affix my signature in presence of two witnesses.

WOOLSEY McA. JOHNSON.

Witnesses:
A. H. GRAHAM,
HARRY L. HILLMAUF.